United States Patent [19]

Gercekci et al.

[11] 4,446,475

[45] May 1, 1984

[54] MEANS AND METHOD FOR DISABLING ACCESS TO A MEMORY

[75] Inventors: Anil Gercekci, Geneva, Switzerland; Heinz B. Maeder, Taeby, Sweden

[73] Assignee: Motorola, Inc., Schaumburg, Ill.

[21] Appl. No.: 282,197

[22] Filed: Jul. 10, 1981

[51] Int. Cl.³ .................... H01L 27/04; G11C 11/40
[52] U.S. Cl. ............................ 357/40; 235/487;
235/492; 357/45; 357/85; 357/84; 365/94;
365/189; 29/583; 29/591
[58] Field of Search ............... 235/487, 492; 365/94,
365/96, 189; 357/40, 45, 51, 53, 68, 84, 85

[56] References Cited

U.S. PATENT DOCUMENTS 3,484,341 12/1969 Devitt .
3,544,861 12/1970 Kooi .................................. 357/53
4,004,133 1/1977 Hannan .
4,105,156 8/1978 Dethloff ........................... 235/487
4,144,523 3/1979 Kaplit ................................ 365/96
4,219,827 8/1980 Kaiser ................................ 357/53

OTHER PUBLICATIONS

Shultis, IBM Technical Discl. Bulletin, vol. 13, No. 7, Dec. 1970, p. 1793.
Brickman, IBM Technical Discl. Bulletin, vol. 13, No. 7, Dec. 1970, pp. 1927-1928.

Primary Examiner—William D. Larkins
Attorney, Agent, or Firm—Joe E. Barbee

[57] ABSTRACT

An integrated circuit chip having a digital memory is provided wherein direct access to at least a portion of the memory is prevented. Contact pads having coupling lines to couple the contact pads to the memory bus are provided. A security code can be programmed into a portion of the memory during wafer probe and test. When the integrated circuit chip is removed from the wafer the coupling lines between the contact pads and the memory bus are destroyed since the coupling lines are made to extend off of the chip.

6 Claims, 5 Drawing Figures

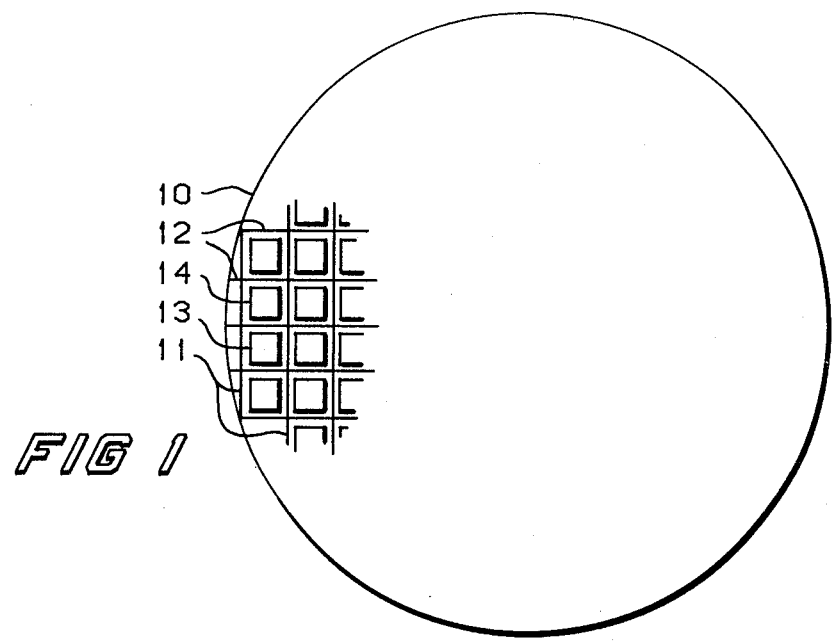
FIG 1
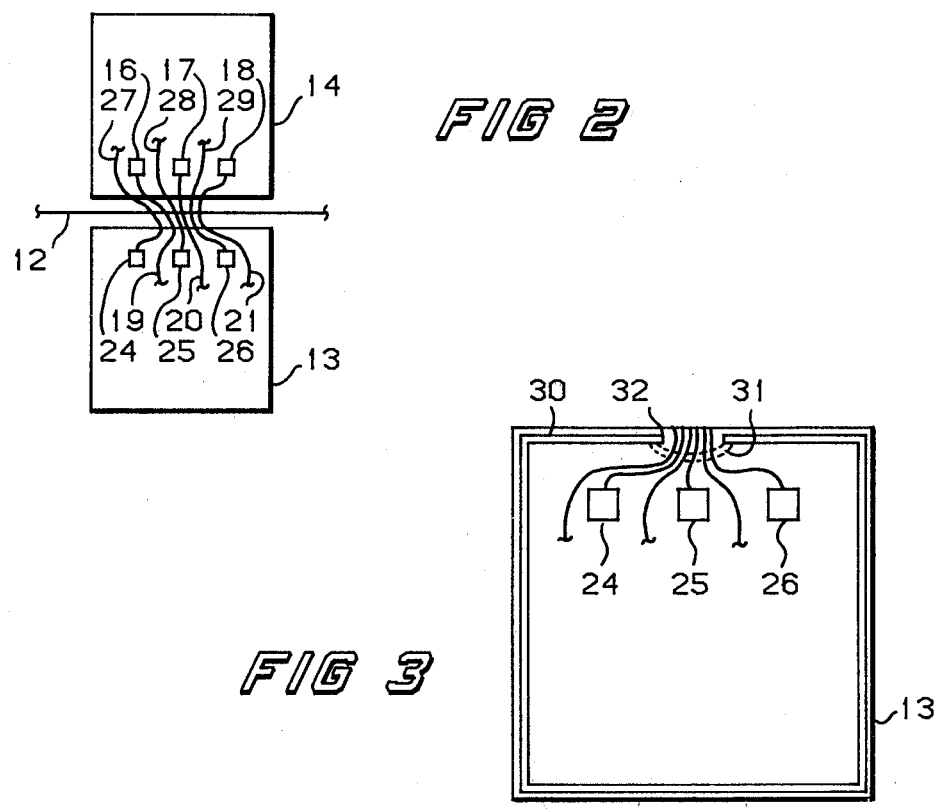
FIG 2
FIG 3

MEANS AND METHOD FOR DISABLING ACCESS TO A MEMORY

FIELD OF THE INVENTION

This invention relates, in general, to semiconductor memories, and more particularly, to means and method for disabling direct address to at least a portion of a digital semiconductor memory.

BACKGROUND

Some memories have a destructive type of access to the memory in the form of a fuse-link. Programmable read-only-memories (PROM) are typical of such memories. Once data is written into the memory the programmer has the capability of disabling access by destroying the fuse-link thereby preventing modification of that data. When, however because of packaging density, a floating-gate PROM or EPROM array is considered, the use of a fuse-link is becoming more difficult to achieve.

With the advent of semiconductor memories being used in credit or security cards it is important to disable the input to at least a portion of the memory so that secret identifying codes contained within that portion of the memory are not modified or read by an unauthorized person who has obtained possession of the identification or credit card. Wider use is being made of memories in such cards to increase the range of uses and versatility of the cards. As an example, a memory can be placed on the same semiconductor chip as a microprocessor, wherein the semiconductor chip is embedded or enclosed within the card and is activated upon each use of the card.

Accordingly, it is an object of the present invention to provide an improved means and method for disabling access to a memory on a semiconductor chip once the chip is removed from the wafer from which it was formed.

Another object of the present invention is to provide a means and method for disabling access to a portion of a semiconductor memory and at the same time to minimize the possibility of contamination affecting the active circuitry on the semiconductor chip.

Yet another object of the present invention is to provide access lines to a portion of a memory on a semiconductor chip which are severed when the semiconductor chip is separated from the wafer from which it was made.

SUMMARY OF THE INVENTION

In carrying out the above and other objects and advantages of the present invention there is provided a means and method for disabling access to a portion of a digital memory located on a semiconductor chip. The semiconductor chip is formed on a wafer with a plurality of other chips. Customarily the chips are arranged in an array and the chips are spaced apart from each other by a small margin. Electrical lines which control access to the portion of the memory concerned with extend off of the chip. Before the chips are removed from the wafer a scribe line is made between the chips to make separation of the chips from the wafer easier. The wafer is then separated along these scribe lines resulting in individual semiconductor chips or dies. Since the lines controlling access to at least a portion of the memory are destroyed during the separation of the semiconductor chip from the wafer, access can no longer be made to that portion of the memory. Therefore, a desired secret identifying code can be entered into the memory before the actual separation.

The subject matter which is regarded as the invention is set forth in the appended claims. The invention itself, however, together with further objects and advantages thereof, may be better understood by referring to the following detailed description taken in conjunction with the accompanying drawings.

BRIEF DESCRIPTION OF THE DRAWINGS

FIG. 1 is a plan view of a wafer;

FIG. 2 shows, in enlarged form, two adjacent chips of the wafer of FIG. 1;

FIG. 3 shows a larger view of one of the chips of FIG. 2;

DETAILED DESCRIPTION OF THE DRAWINGS

Figure 4:
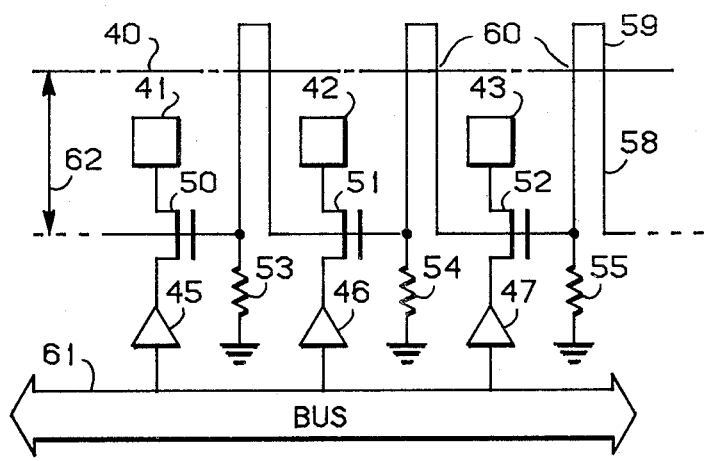
FIG. 4 illustrates another embodiment of the present invention.

In the manufacture of integrated circuits it is customary to form the integrated circuits on a silicon wafer which is normally circular in configuration. FIG. 1 illustrates a wafer 10 having a plurality of integrated circuits formed thereon and arranged in an array. For brevity only a portion of the array is illustrated. Two such integrated circuits are illustrated as chips 13 and 14. Separation of the chips is accomplished by first providing a plurality of scribe lines which divide the integrated circuit array into columns and rows. A plurality of scribe lines 11 define the columns while a plurality of scribe lines 12 define the rows. The integrated circuits are separated from each other by breaking the wafer along the scribe lines.

FIG. 2 illustrates two adjacent integrated circuit chips 13 and 14. It is customary to provide contact pads around the periphery of the integrated circuit chip. These contact pads are used for making contact to the circuit on the chip. However, in the present invention it is desired to disable direct access to at least a portion of the circuitry on the chip. FIG. 2 illustrates one embodiment of the invention which is used to eliminate access to a portion of the chip once the chip is separated from the wafer. While the chip is on the wafer access to the circuit can easily be made by use of the contact pads during probe testing of the wafer. At this time a desired code or information can be placed in a programmable read-only-memory (PROM) contained on the chip. Once the wafer is broken up along the scribe lines this easy access to that portion of the PROM is eliminated.

In FIG. 2, integrated circuit 13 is illustrated as having contact pads 24, 25, and 26 adjacent each other. However, these contact pads are used to make contact to a memory circuit contained on adjacent integrated circuit chip 14. A line 27 is connected to contact pad 24; a line 28 is connected to contact pad 25; and a line 29 is connected to contact pad 26. Lines 27, 28 and 29 are connected to circuitry on chip 14 and are not connected to circuitry on chip 13. Chip 14 is shown as having contact pads 16, 17, and 18 adjacent to each other. A line 19 is connected to pad 16; a line 20 is connected to pad 17; and a line 21 is connected to pad 18. It should be noted that lines 19, 20, and 21 are only connected to internal circuitry on integrated circuit chip 13. When the wafer containing chips 13 and 14 is broken up along scribe line 12 these interconnecting lines will be broken thereby disabling access to the coded portion of the memory. The separated chip can then be used in an identifying card or a credit card. Although only three contact pads and associated connecting lines are illustrated on chips 13 and 14 it will be understood that more or less contact pads may be used in order to disable access to the assigned memory section. In a preferred embodiment, the lines going between the chips are placed close together.

It is also possible to program other portions of the memory even after the chip is separated by use of the other contact pads (not shown) contained on each separate chip. Since integrated circuits are well-known these other contact pads are not illustrated since they are not needed for an understanding of the present invention. It will also be understood that the contact pads are considerably larger than the lines and therefore access to the circuitry by the testing and programming equipment is easily made via the contact pads. Normally the contact pads are used for making connections with the interface pins once the chip is encapsulated. In a high density circuit the lines are extremely narrow and therefore it is very difficult to gain access to the assigned memory section in an attempt to modify the security code by trying to make contact to one of the lines by a probe.

Since the electrical lines cross the scribe line, a local contamination zone may be created because the scribe grid is no longer a closed ring around the chip. In a typical integrated circuit chip the substrate is a silicon substrate. Towards the edge of the chip the substrate is covered by silicon dioxide which in turn is covered by a layer of polysilicon, commonly called poly, or a layer of metal. The entire chip is normally coated by a passivation layer. Normally the poly or metal layer does not go all the way to the scribe line and therefore no open silicon-silicon dioxide interface occurs at the edge of the chip. Where a poly or metal line extends pass the scribe line a possible contamination zone occurs at the silicon dioxide to silicon substrate interface along the scribe line cut. This is caused by the open silicon-silicon dioxide interface being open to the air and is mainly caused by sodium ions seeping into the chip via this exposed interface.

FIG. 3 illustrates one possible solution to the contamination problem. As illustrated, integrated circuit chip 13 has a guard ring 30 which normally encloses the entire perimeter of the chip. However, as shown in FIG. 3, an opening 32 in guard ring 30 is provided in order for the interconnecting lines to pass through opening 32. By making opening 32 small the area of possible contamination is minimized. One way to prevent contamination from entering through opening 32 is to provide a diffusion 31 to close opening 32. Diffusion 31 can be a highly doped N-type diffusion if the substrate is P-type.

Another embodiment of the present invention is illustrated in FIG. 4, which shows only a portion of the integrated circuit chip. The portion of the integrated circuit chip illustrated has contact pads 41, 42, and 43 coupled to an address/data bus 61. Contact pad 41 is coupled by a transistor 50 and an input/output buffer 45 to bus 61. Contact pad 42 is coupled by a transistor 51 and an input/output buffer 46. Contact pad 43 is coupled by a transistor 52 and an input/output buffer 47. The gate electrode of transistor 50 is connected to a reference potential illustrated as ground by resistor 53. The gate electrode of transistor 51 is connected to ground by resistor 54 and the gate electrode of transistor 52 is connected to ground by resistor 55. The gate electrodes of transistors 50, 51, and 52 are all connected together to a control signal (not shown). The transistors along with the control line serve as coupling means to couple the contact pads to the input/output buffers. The control line going from the gate electrode of one transistor to the next transistor extends pass the edge of the integrated circuit chip illustrated by scribe line 40. This control line is shown as having two portions, an inner portion 58 and an outer portion 59. When the chip is separated from the wafer along scribe line 40 then the control line is broken thereby disabling access by contact pads 41, 42, or 43 to bus 61. Portion 59 of the control line will remain a portion of the adjacent chip. Due to the fact that the control lines cross the scribe line and the scribe grid is no longer a closed ring around the chip, potential contamination areas 60 are created. However, potential contamination areas 60 are well separated from the first active element by the contamination protection zone illustrated by arrow 62. This zone is mainly determined by the size of the contact pads. Therefore it is very unlikely that contamination occurring on the chip edge will reach an active element due to this large separation.

Figure 5:
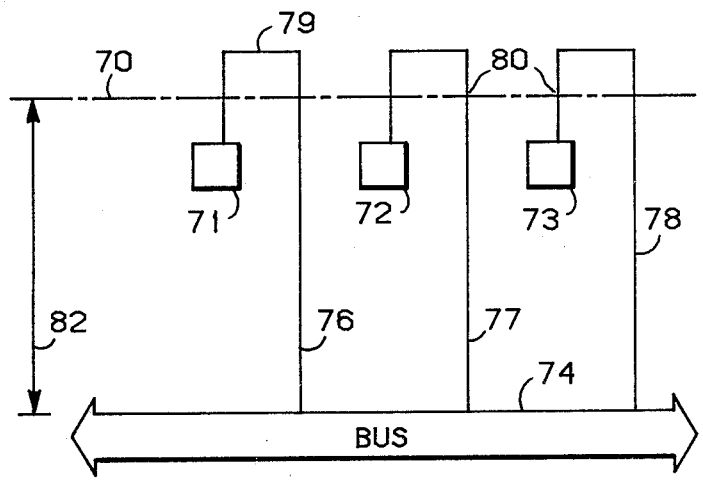
FIG. 5 illustrates yet another embodiment of the present invention.

FIG. 5 illustrates yet another embodiment of the present invention, and shows a portion of an integrated circuit chip having contact pads 71, 72, and 73. Each contact pad 71, 72, and 73 is coupled by a line 76, 77, and 78, respectively, to an address/data bus 74. Lines 76, 77, and 78 serve as coupling means. Each line has a portion, as illustrated by portion 79 which extends off the edge of the chip. The edge of the chip is illustrated by scribe line 70. Once the chip is separated from the wafer along scribe line 70 potential contamination areas 80 are created. These potential contamination areas are created everywhere the line intersects the scribe grid. To avoid the contamination from affecting active portions of the circuit contained on the integrated circuit chip the active elements are placed outside of the contamination protection zone illustrated by arrow 82. Once contact pads 71, 72, and 73 are used to program a security code in the assigned memory section, the chip can be removed from the wafer thereby disabling access to that assigned memory section by way of contact pads 71, 72, or 73.

By now it should be appreciated that there has been provided means and method for disabling access to a predetermined or assigned memory section of a memory contained on an integrated circuit chip. In describing the present invention it was assumed that a PROM was used. The PROM can be tested at probe test by means of the contact or test pads provided. At the end of the probe test a security code can be stored in a particular section of the PROM still using the test or programming equipment and accessing the internal circuitry via the contact or test pads. Once the integrated circuits are separated along the scribe lines from the wafer the test pads are disabled by the coupling lines provided. Accordingly, access to the internal circuitry with probe needles is greatly hindered. If the PROM is made on an integrated circuit chip containing a microprocessor then access to the PROM is controlled and maintained by the microprocessor via its own firmware. In order to protect the security information stored in the assigned section of the memory it is necessary that the firmware does not make a WRITE operation to those specific locations where the security information is stored. This invention allows a security code to be placed at any physical and logical location in the EPROM. The size of the security code is determined by the firmware. Improved protection of the designated portion of the memory results from the fact that access to the test pads is severed when the chip is removed from the wafer thereby inhibiting access to the internal address and data bus of the circuit. Allowing the on-chip firmware to determine the security code, the physical location and distribution of the code can be distributed over the memory array thereby providing extra protection.

In some cases it may be possible to use destructive type of control lines such as a fusible poly links; however, this is becoming more difficult to do since floating gate PROMs are used in order to achieve higher packing density. Another alternative would be to use a laser beam to destroy the on-chip interconnection or coupling means between the contact pads and the internal bus.

We claim:

1. A semiconductor chip having a digital memory wherein direct access to at least a portion of the memory is prevented, the semiconductor chip having been formed on a wafer and then separated therefrom, comprising:
contact pads for making electrical contact to the memory; memory bus for carrying data to and from the at least a portion of the memory; and means coupling some of the contact pads to the memory bus, the means having a portion thereof extending off the semiconductor chip to disable the means after the semiconductor chip is separated from the wafer from which the chip was made.

2. A semiconductor chip having a digital memory wherein direct access to at least a portion of the memory is prevented, comprising:
contact pads for making electrical contact to the memory; memory bus for carrying data to and from the memory; and means coupling the contact pads to the memory bus, the means having a portion thereof extending off the semiconductor chip so that the means becomes disabled when the semiconductor chip is separated from a wafer from which the chip was made wherein the means is a transistor coupled between the contact pad and the memory bus, the transistor having a control electrode coupled to a control signal by a line wherein the line extends off the semiconductor chip.

3. The semiconductor chip of claim 1 wherein the contact pad is coupled to the memory bus by a line wherein the line extends off the semiconductor chip.

4. A semiconductor memory chip made from a wafer along with a plurality of other semiconductor memory chips wherein an adjacent memory chip forms a pair with the semiconductor memory chip, at least one contact pad located on the semiconductor memory chip, at least one contact pad located on the adjacent memory chip, a first line connecting a portion of a memory on the semiconductor memory chip to the contact pad on the adacent memory chip without connecting to any contact pad on the semiconductor memory chip, and a second line connecting a portion of a memory on the adjacent memory chip to the at least one contact pad on the semiconductor memory chip without connecting to any contact pad on the adjacent memory chip to inhibit further access to the portion of the memory on the pair of memory chips by way of the at least one contact pads when the chips are separated.

5. A method of disabling direct access to at least a portion of a memory comprising: providing at least one contact pad on a semiconductor chip wherein the memory is located; providing coupling means to the at least one contact pad to couple the contact pad to the at least a portion of the memory; providing lines as a portion of the coupling means, the lines extending off of the semiconductor chip; disabling the coupling means by severing the lines.

6. A method of disabling direct access to at least a portion of a memory located on a semiconductor chip wherein the semiconductor chip is formed on a wafer with at least an adjacent chip also having a memory, the method comprising: providing at least one contact pad on each of the chips; coupling the contact pad on the semiconductor chip to circuitry on the adjacent chip; coupling the contact pad on the adjacent chip to circuitry on the semiconductor chip; and separating the semiconductor chip and the adjacent chip thereby disabling the coupling to the pads which results in interrupting access from the contact pads to a predetermined location in memory.

* * * * *